United States Patent [19]

Heidt et al.

[11] 4,364,001
[45] Dec. 14, 1982

[54] CIRCUIT ARRANGEMENT FOR ENERGY ECONOMY

[75] Inventors: Alfred Heidt, Schwetzingen; Erich Link, Brühl; Wolfgang Ortlieb, Leinfelden-Echterdingen, all of Fed. Rep. of Germany

[73] Assignee: Frankl & Kirchner GmbH & Co. KG Fabrik für Elektromotoren u. elektrische Apparate, Schwetzingen, Fed. Rep. of Germany

[21] Appl. No.: 187,548

[22] Filed: Sep. 16, 1980

[30] Foreign Application Priority Data

Sep. 25, 1979 [DE] Fed. Rep. of Germany ....... 2938625

[51] Int. Cl.³ .................................................. H02P 5/40
[52] U.S. Cl. ................................... 318/371; 318/269; 318/765; 112/277
[58] Field of Search ............... 318/371, 372, 269, 765, 318/345 C, 345 P, 345 G, 345 H, 729; 310/95; 192/12 D; 112/275, 277

[56] References Cited

U.S. PATENT DOCUMENTS

| | | | |
|---|---|---|---|
| 3,702,127 | 11/1972 | Yokoyama | 192/12 D |
| 3,860,860 | 1/1975 | Moron et al. | 318/269 |
| 3,885,175 | 5/1975 | Palloch | 310/68 D |
| 4,011,490 | 3/1977 | Daab et al. | 318/269 |
| 4,032,648 | 10/1977 | Nola | 318/729 |
| 4,137,860 | 2/1979 | Yoneji et al. | 318/371 |
| 4,190,793 | 2/1980 | Parker et al. | 318/800 |

FOREIGN PATENT DOCUMENTS

WO80/02895 12/1980 PCT Int'l Appl. ............ 318/729

*Primary Examiner*—David Smith, Jr.
*Attorney, Agent, or Firm*—Browdy and Neimark

[57] ABSTRACT

An arrangement for energy economy in a drive which includes an induction motor and a clutch-brake unit, particularly for sewing machines is provided. The windings of the induction motor are dimensioned so that the motor speed remains virtually constant in a stable speed range under normal service conditions, and in which the clutch-brake unit serves to control the drive output speed, so that the motor operates in an alternation of load phases and no-load phases. Switches are included in the current paths of the windings, which reduce the current through the windings to a prescribable degree. A modulation circuit to control the acceleration of the motor speed and its persistence in the stable speed range during load variations is associated with the switches. The modulation circuit contains a delay element, which is triggered when the mains voltage is applied, and an impulse prolongation element having a time constant dimensioned so that the motor remains in the stable speed range under all service conditions.

3 Claims, 8 Drawing Figures

CIRCUIT ARRANGEMENT FOR ENERGY ECONOMY

BACKGROUND OF THE INVENTION

The invention relates to a circuit arrangement for every economy in a drive which includes an induction motor and a clutch-brake unit. Windings of the induction motor are dimensioned so that its speed is virtually constant in a stable range under normal service conditions. The clutch-brake controls output speed.

Energy economy circuits for motors have attained interest particularly for mobile appliances which are fed from limited energy accumulators. This is particularly of interest in view of the so-called energy crisis. A circuit arrangement is known from German Offenlegungsschrift No. 27 30 774, in which the energy consumption of an alternating-current induction motor is minimized under different service conditions by determining the loss factor (cos. ρ) on the basis of current and voltage measurements at the motor and maintaining its constant using electronic circuitry at the level which it assumes at nominal speed and nominal load. This results in a reduction in the stable speed and torque range, so that such a circuit arrangement has only limited usefulness.

A motor circuit for energy economy is known from German Offenlegungsschrift No. 28 24 474, in which the speed of the motor is maintained constant irrespectively of the load. A separate speed detection device is necessary for this purpose. When alternating-current induction motors are used in the field of sewing machines, in which the output speed is controlled by clutch brake units, the known energy economy circuits are unsuitable from the standpoints both of outlay and of use. This is because, by the use of suitable alternating-current induction motors, the speed thereof remains virtually stable in any case if such motors are kept in the stable speed range.

SUMMARY OF THE INVENTION

It is the object of the invention to provide a circuit arrangement of the above-mentioned type which, whilst involving a low production outlay, exhibits optimum energy economy for the purpose in view.

This object, as well as others, achieved according to the invention by providing in an arrangement for energy economy in a drive including an induction motor and a clutch-brake unit, particularly for sewing machines, in which the windings of the induction motor are selected so that the motor speed remains virtually constant in a stable speed range under normal service conditions, and in which the clutch-brake unit serves to control the drive output speed, so that the motor operated in an alternation of load phases and no-load phases. Switches are included in the current paths of the windings, which reduce the current through the windings a predetermined amount, whilst a modulation circuit to control the acceleration of the motor speed and its persistence in the stable speed range during load variations is associated with the switches. By this arrangement the stable speed range is attained as quickly as possible and is maintained reliably, and no-load losses are considerably reduced by the prescribed current reduction under no-load. Since only switches and a modulation circuit are used to influence the current, the production outlay is small. For the same reason it is possible, e.g., for the circuit arrangement to be accommodated in the terminal board region of the motor, optionally as an extension kit.

An acceleration of the motor is reliably ensured, and can be realised with a very small outlay, under the service conditions existing during sewing operations using a delay element. In particular, the modulation circuit contains a delay element which is triggered when the mains voltage is applied, whilst the time constant of the delay element is dimensioned so that the motor attains its stable speed range within the period determined by the element.

A particularly simple type of the modulation circuit can be used, by means of which the motor remains in the stable speed range even in the case of brief and frequent load changes, a time constant circuit being provided in this case, the modulation circuit contains an impulse prolongation element, the time constant of which is selected so that the motor remains in the stable speed range under all service conditions.

A curent switch can be provided, which achieves a reduction in the components used in the circuit arrangement. This is achieved by providing that with at least one of the switches there is associated a phase shifter circuit to control this switch as a low-loss valve.

BRIEF DESCRIPTION OF THE DRAWING

Further features and advantages of the invention will emerge from the description of a number of exemplary embodiments of the invention given hereinbelow with reference to the drawing, wherein.

DETAILED DESCRIPTION OF THE PREFERRED EMBODIMENTS

The exemplary embodiments relate to sewing machine drives, in which an alternating-current induction motor works via a clutch-brake unit, by means of which the instantaneous output speed is adjusted by the interplay of clutch and brake. The clutch is excited electromagnetically. From the clutch modulation an electrical signal can be tapped, which indicates the presence of this modulation. It is designated hereinbelow the clutch impulse. Such drives with clutch-brake units are known e.g., from German Auslegeschrift No. 22 63 259 (corresponding to U.S. Pat. No. 3,885,175). These generally known devices are therefore not explained in detail hereinbelow.

Figure 1:
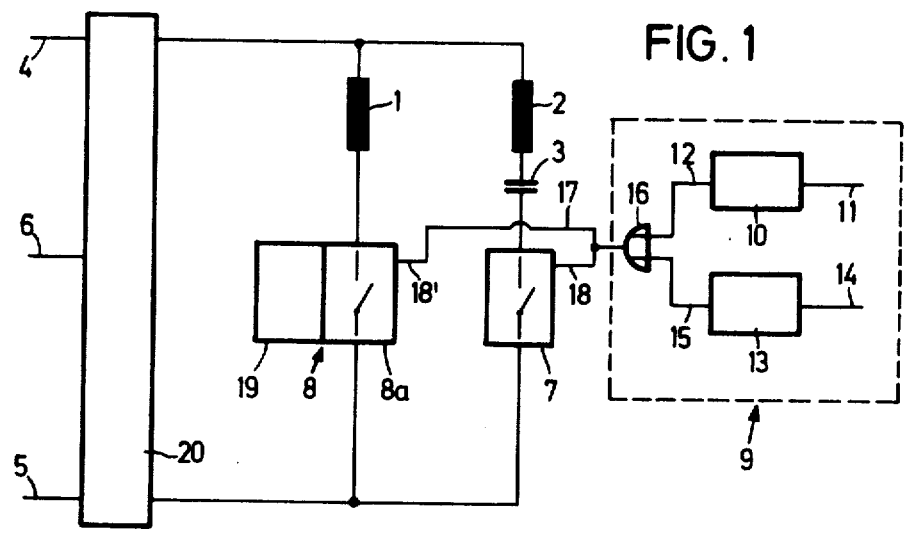
FIG. 1 shows a circuit according to the invention of a single-phase alternating-current induction motor provided with a main winding and with an auxiliary winding.

In a circuit according to FIG. 1, an alternating-current induction motor with a main winding 1 and with an auxiliary winding 2 is used. A phase shifter capacitor 3 ensures a virtually circular rotating field for motor starting and operation under load; the auxiliary winding 2 is switched on not only during the acceleration, but is also energised during service under load. The windings receive the service current from two bus-bars 4 and 5 for the phase and the neutral conductor. An earth bar 6 is also present. Mains current passes through a switch 7 to the auxiliary winding 2. Current passes through a current valve/switch 8 to the main winding 1.

The switches 7 and 8 are connected to a modulation circuit 9. In the latter, a delay element 10 is connected on the input side to an initiating wire 11 and has an output wire 12. An impulse prolongation element (time constant circuit) 13, connected to an input wire 14, has an output wire 15 which, like the output wire 12 of the delay element 10, terminates in an OR-gate 16 as one of its input wire. The output wires 17 of the OR-gate leads to the control inputs 18, 18' both of the switch 7 and of the current valve/switch 8.

The current valve/switch 8 comprises a switch 8a modulable through the control input 18, and a phase shifter circuit 19 which is responsible for the valve action of the switch 8a.

The bus-bars 4 and 5 are passed through a mains filter 20, which is also connected to the earth bar 6.

The circuit operates as follows:

An initiating impulse on the initiating wire 11, which is generated when the mains supply is turned on by a mains switch, not shown, triggers the delay element 10. Its output impulse passes through the OR-gate 16 to the inputs of the switches 7 and 8, which it closes. Full service current therefore flows through the motor windings 1 and 2. The motor accelerates and tends towards its no-load speed. The time constant of the delay element is adjusted so that the motor with flywheel mass attains its no-load speed within the running time of the delay element 10. As soon as the clutch on the motor engages, a clutch impulse appears on the wire 14. It is transmitted through the impulse prolongation element 13 to the OR-gate 16 and therefore, by closing the switches 7 and 8, produces full current through main winding 1 and auxiliary winding 2. After the end of the clutch impulse, which persists as long as the clutch transmits torque from the motor to the drive output side, the action of the impulse prolongation element 13 commences. As soon as its delay time has expired, the switches 7 and 8 open. The motor runs at no-load speed. The current through the auxiliary winding 2 is no longer required, because no-load conditions exist after the release of the clutch. At the no-load speed, the current through the main winding 1 finds such a torque in the motor that the rotary movement of the motor is maintained. With the elimination of the modulation of the switch 8, the latter becomes a current-controlling valve, inasmuch as it now, modulated by the phase shifter circuit 19 structurally combined with it, conducts only during a part of the full mains cycle. In the no-load case the motor losses are considerably reduced by the reduction of the motor current. Measurements have shown a reduction in consumption by approx., 80% when the valve action of the switch 8 was optimally adjusted in accordance with the motor type. Because high-frequency perturbations may reach the bus-bars 4 and 5 due to the valve action of the switch 8 when modulated by the phase shifter current 19, the filter 20 is provided to attenuate these perturbations.

Figure 2:
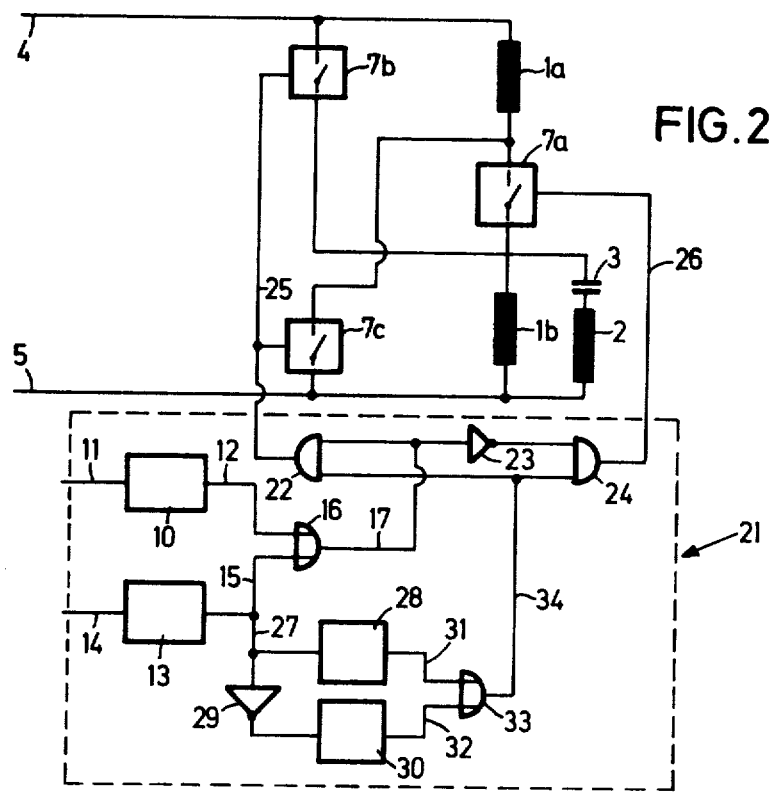
FIG. 2 shows a circuit of a single-phase alternating-current induction motor provided with a divided main winding and with an auxiliary winding.

If it is absolutely necessary to avoid high-frequency perturbations which may appear during the valve action of the switch 8, the circuit arrangement of a single-phase alternating-current induction motor according to FIG. 2 should be adopted. The motor exhibits a divided main winding 1a and 1b and an auxiliary winding 2 with the phase shifter capacitor 3, whilst capacitor 3 and winding 2 are placed in parallel with the partial main winding 1b. Switches 7a, 7b, 7c are placed in the current paths to the windings 1a, 1b, 2. The switches 7b, 7c are modulated in common and simultaneously. They connect the two partial main windings 1a, 1b in parallel as soon as they are closed. By closing the switch 7a with the switches 7b, 7c simultaneously opened, the two partial main windings 1a, 1b are connected in series.

A modulation circuit 21 serves for the functionally correct modulation of switches 7a, 7b and 7c. It contains a delay element 10, connected on the input side to the initiating wire 11, with an output wire 12, an impulse prolongation element 13 with an input wire 14 and an output wire 15. The two output wires 12, 15 are combined through an OR-gate 16, the output of which is connected to the output wire 17. Signals appearing on this wire 17 are fed both to an AND-gate 22 and also, after inversion by the inverter 23, to an AND-gate 24. The output of the AND-gate 22 is connected to a wire 25 which leads to the switches 7b, 7c. The output of the AND-gate 24 is fed to a wire 26 which connects it to the switch 7a. The output of the impulse prolongation element 13 leads through the wire 15, not only to the OR-gate 16, but through a wire 27 to a monostable flip-flop (monoflop) 28 and to an inverter 29. The output of the inverter works to a monostable flip-flop (monoflop) 30. A discrete construction of the inverter may be omitted if the monostable flip-flop 30 already contains an integrated inverter. The monostable flip-flops 28, 30 are connected on the output side through wires 31, 32 to an OR-gate 33 which leads on its output side through the wire 34 to the inputs of the AND-gates 22, 24.

The function of this circuit is as follows:

With an initiating impulse on the initiating wire 11 to the delay element 10, the two switches 7b, 7c are closed through the OR-gate 16 and the AND-gate 22. The two partial main windings 1a, 1b together with the auxiliary winding 2 are placed in parallel between the bus-bars 4 and 5. The motor receives full current and accelerates during the time prescribed by the delay element 10. A clutch impulse likewise passes to the switches 7b, 7c through the wire 14, the impulse prolongation element 13, the OR-gate 16 and the AND-gate 22. The partial main windings 1a, 1b are therefore connected in parallel during the clutch impulse. At the end of the clutch impulse the running time of the impulse prolongation element 13 commences and maintains the switches 7b, 7c closed until the end of the period. With each switching of the impulse prolongation element 13, i.e., both at the initial flank of the clutch impulse and upon its decay, one of the monostable flip flops 28, 30 is triggered. The output signals of these flip-flops 28, 30 are combined by the OR-gate 33 and control the AND-gates 22, 24, namely in the sense that the gates 22, 24 are blocked to modulation signals of the switches 7a, 7b, 7c during the period of the monostable flip-flops 28, 30. The switches 7a, 7b, 7c are then opened, or open not later than the expiration of the halfwave of the mains phase present at that time. The monostable flip-flops 28, 30 therefore exhibit periods which are greater than or equal to half a mains cycle. Under no-load, when the clutch impulse has decayed, no modulation passes through the gate 22 to the switches 7b, 7c. Then a modulation signal passes from the inverter 23 through the AND-gate 24 to the switch 7a. The partial main windings 1a, 1b are therefore connected in series. The current flux through the motor is reduced. The losses become smaller. Measurements have revealed an energy economy of approximately 60%.

Figure 3:
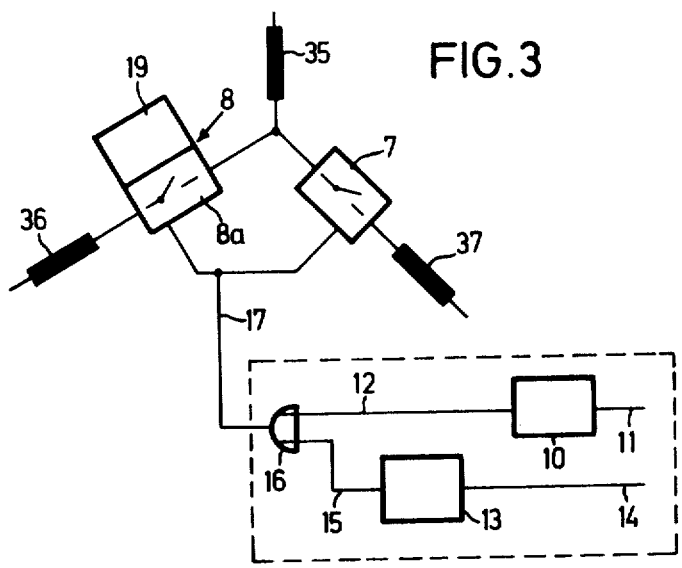
FIG. 3 shows a circuit of a three-phase induction motor in star circuit.

In the case of a three-phase alternating-current induction motor with the type of circuit according to FIG. 3, its three windings 35, 36, 37 are switched on fully by switches 7, 8 for acceleration or during torque delivery. The switch 8 acts conjointly with a phase shifter circuit 19 as a current valve when the motor is operating under no-load.

The switches 7, 8 are controlled by a modulation circuit 9 which corresponds to the modulation circuit according to FIG. 1 and to the description thereof above.

The function of the winding circuit is as follows:

An incoming impulse on the initiating wire 11 triggers the delay element 10, which closes the switches 7, 8 through the OR-gate 16. A clutch impulse on the input wire 14 of the impulse prolongation element 13 likewise closes the switches 7, 8 through the OR-gate 16. These switches still remain closed for some time after the end of the clutch impulse in conformity with the period of the impulse prolongation element 13. Then they open. The switch 7 interrupts the current flux through the winding 37. The phase shifter circuit 19 acts after the elimination of the modulation of the switch 8 so that the latter operates as a current valve in accordance with the phase shifter circuit 19 and is closed only during brief times within each mains cycle. The windings 35, 36 are connected in series together with the current/valve switch 8. An energy economy of approximately 60% is obtained in this case due to the reduction of the current flux.

An impulse prolongation element 13 is contained in each of the modulation circuits 9, 21. It causes the respective connected motor to continue to receive full current for some time after the release of the clutch i.e., after the end of the clutch impulse. Thus, motor speed is maintained even in the case of frequent load changes, because the torque of the motor does not fall below its breakdown torque. The period of the impulse prolongation element must accordingly be arranged so that the attainment of the stable speed range and consequently a persistence therein is ensured after brief heavy loading of the motor. Such impulse prolongation elements 13 are commercially available as integrated circuits.

In the context of the alternating-current induction motors used here, breakdown torque is understood to mean the torque which is attained after their acceleration, when starting torque and acceleration torque occur. The breakdown torque has a maximum value, which decreases to zero during the further acceleration of the motors. The speed range between the breakdown torque and the diminishing torque which follows it in speed is designated the stable speed range. Normal service conditions exist when the motor can accelerate from standstill into the region of the stable speed range and if, after acceleration, load and supply conditions exist in such combination that the motor is not constrained to leave the stable speed range. Because it is necessary for acceleration under load to be possible, the modulation prolongation of the switches 7, 8 acts in the sense that, even when the speed falls below that pertaining to the breakdown torque, when the load is disconnected the motor rises back above the breakdown torque into the stable speed range.

The delay element 10, which is present in both modulation circuits 9, 21 and is commercially available as an integrated component, serves for acceleration. During acceleration the stable speed range has not yet been attained. By a sufficiently long application of the full service voltage to the motor through the delay element 10, it is achieved during acceleration that the breakdown torque is exceeded and the stable speed range is therefore attained under normal service conditions. Normal also means here that the breakdown torque can be exceeded, i.e., that the motor is not subject to such heavy loads that its rotation is blocked.

Figure 4:
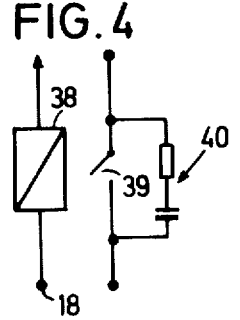
FIGS. 4 to 6 show various embodiments of current switches.
Figure 5:
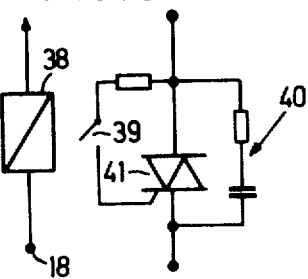
Figure 6:
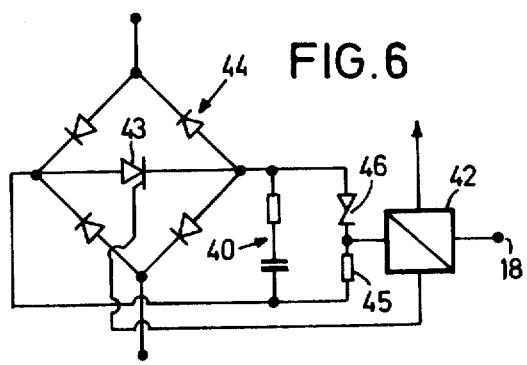

FIGS. 4, 5, 6 show three possible embodiments of a potential-free current circuit for use as the current switches described above. The simplest possibility (FIG. 4) is that a modulation signal through the relevant control input 18 makes a relay 38 react. The latter operates a contact 39, which directly assumes the current circuit. An RC-combination 40 placed in parallel with the contact 39 counteracts sparking.

Over longer periods of time the variant according to FIG. 5 operates more reliably than a circuit according to FIG. 4; in this variant a contact 39 of the relay 38 switches, not the full motor current, but only a small auxiliary current for a triac 41. The triac is protected by an RC-combination 40.

In the case of a switch 7 according to FIG. 6, switching contacts are avoided. The modulation signal through the input 18 switches on, through an optocoupler 42, a thyristor 43 which is placed in a diode bridge 44. Here again an RC-combination 40 protects the switching element, the thyristor 43. The optocoupler 42 switches to the gate of the thyristor 43 a current which is prescribed by a resistor 45 and is limited by a Zener diode 46 so that, in the event of the nonmodulation of the optocoupler 42, no voltage which might damage the latter is applied to it.

Figure 7:
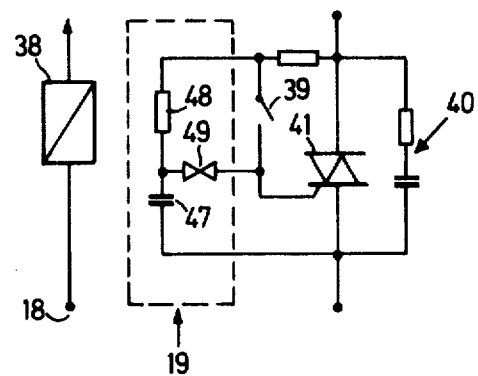
FIGS. 7 and 8 show various embodiments of current switches when additionally used as current reducing valves.
Figure 8:
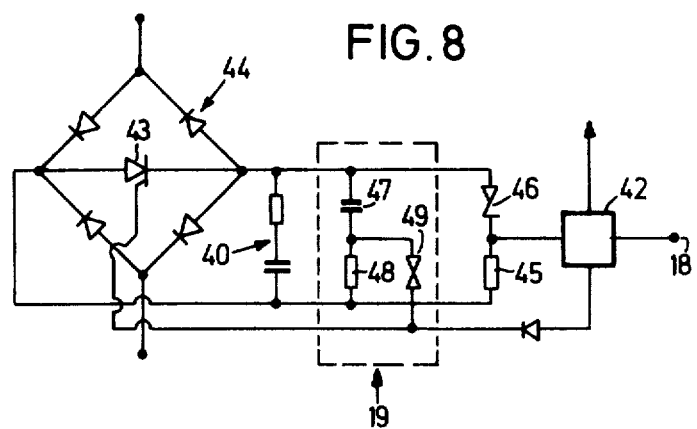

If the switches according to FIGS. 5 and 6 are extended by a phase shifter circuit 19, then this leads to the embodiments according to FIGS. 7 and 8. Here triac 41 and thyristor 43 are supplied, even during the opening times of the contact 39 or of the optocoupler 42, with modulation signals which appear when such a high voltage has been attained at a capacitor 47 through a resistor 48 by charging from the mains halfwave, that a diac 49 ignites and therefore delivers a powerful impulse to the gates of triac 41 and thyristor 43.

We claim:

1. In a circuit arrangement for economizing the use of electrical energy in a drive which includes an induction motor and a clutch-brake unit particularly for sewing machines, in which the windings of the induction motor are such that the motor speed remains virtually constant in a stable speed range under under normal service conditions, and in which the clutch-brake unit serves to control the drive output speed so that the motor operates in an alternation of load phases and no-load phases, the improvement wherein switches (7, 8) are included in the current paths of said windings (1,2) to reduce the current flow through said windings (1,2) by a predetermined amount, and wherein the arrangement includes modulation circuit means (9) operatively cooperable with said switches (7,8), said modulation circuit means (9) containing a delay element (10) which is triggered when the mains voltage is applied, and an impulse prolongation element (13) which receives a switching signal when said clutch is engaged, wherein at least one of said switches (7 or 8) comprises a Triac (41) or thyristor (43), and wherein a phase shifter circuit (19) cooperates with at least one of said switches (7 or 8), whereby at least one of said switches (7 or 8) is controlled so as to minimize the current loss in the circuit arrangement via said at least one switch (7 or 8).

2. A circuit arrangement in accordance with claim 1, characterized in that an initiating line (11) for the trigger signal contains said delay element (10) the time constant of which is dimensioned in such a way that the motor reaches its stable speed range within the time limit determined by said delay element (10).

3. A circuit arrangement in accordance with claim 1 or 2, characterized in that said motor is a single-phase induction motor with a divided main/winding, and one of said switches (7) comprises a set of switches (7a,7b,7c) disposed in series or in parallel for the switching of the partial main windings (1a,1b).

* * * * *